United States Patent [19]
Driendl et al.

[11] Patent Number: 6,086,177
[45] Date of Patent: Jul. 11, 2000

[54] PROCESS FOR CONTROLLING CLOSING MOVEMENT OF CLOSING MECHANISMS WITH IMMEDIATE SQUEEZE PROTECTION AFTER ACTIVATION OF A MECHANISM

[75] Inventors: Dieter Driendl, Untersiggingen; Erwin Kessler, Saulgau; Kurt Kleiner, Messkirch; Wolfgang Schulter, Meersburg, all of Germany

[73] Assignee: Temic Telefunken microeletronics GmbH, Heilbronn, Germany

[21] Appl. No.: 09/041,596

[22] Filed: Mar. 13, 1998

[30] Foreign Application Priority Data

Mar. 13, 1997 [DE] Germany ............................ 197 10 338

[51] Int. Cl.$^7$ ...................................................... H02P 3/00
[52] U.S. Cl. ................................ 312/466; 318/286; 49/28
[58] Field of Search .................................... 318/280–286, 318/466–472; 49/26, 28; 160/291, 292, 293.1

[56] References Cited

U.S. PATENT DOCUMENTS

| | | |
|---|---|---|
| 4,641,067 | 2/1987 | Iizawa et al. . |
| 4,980,618 | 12/1990 | Milnes et al. ............................ 318/265 |
| 5,325,036 | 6/1994 | Diethert et al. ......................... 318/802 |
| 5,334,876 | 8/1994 | Washeleski et al. .................... 307/10.1 |
| 5,625,175 | 4/1997 | Gutknecht et al. ...................... 187/316 |
| 5,789,887 | 8/1998 | Elischewski ............................ 318/468 |
| 5,841,083 | 11/1998 | Schonauer et al. ...................... 187/316 |

FOREIGN PATENT DOCUMENTS

| | | |
|---|---|---|
| 3034118C2 | 12/1983 | Germany . |
| 3346366C2 | 7/1985 | Germany . |
| 3514223C2 | 10/1986 | Germany . |
| 3303590C2 | 8/1994 | Germany . |
| 4339365C1 | 5/1995 | Germany . |
| 4442171A1 | 6/1996 | Germany . |
| 19531456C1 | 2/1997 | Germany . |

Primary Examiner—Jonathan Salata
Attorney, Agent, or Firm—Venable; George H. Spencer; Catherine M. Voorhees

[57] ABSTRACT

A process for controlling the closing movement of closing mechanisms with at least one electromotive part includes the following features to guarantee squeeze protection: the measured values of at least one motor performance characteristic which characterizes the load on the electric motor, are continuously recorded and evaluated, a continuously adapted tripping threshold defining a squeezing incident is specified for each motor performance characteristic, the measured values of each motor performance characteristic are compared with each tripping threshold and, if the tripping threshold is exceeded by at least one measured value, a defined reaction is initiated from the closing mechanisms. Immediately after the start of the closing movement, the starting behavior of the closing mechanism in the starting phase of the electric motor is defined with regard to equalization of drive play and sluggishness of the closing mechanism with reference to measured values of at least one motor performance characteristic relevant to the closing distance. This means that squeeze protection can be activated in the starting phase, relevant to the response relevant to the closing distance of at least one motor performance characteristic, when an activation value relevant to the closing distance is reached. Once squeeze protection has been activated in the starting phase, this additional response of at least one motor performance characteristic relevant to the closing distance is specified up to achieving uniform motion of the electromotive part, taking into consideration the measured values of at least one motor performance characteristic(s) of the previous and current closing movement and the tripping threshold of at least one motor performance characteristic is defined relevant to the given additional response of each motor performance characteristic relevant to the closing distance.

13 Claims, 4 Drawing Sheets

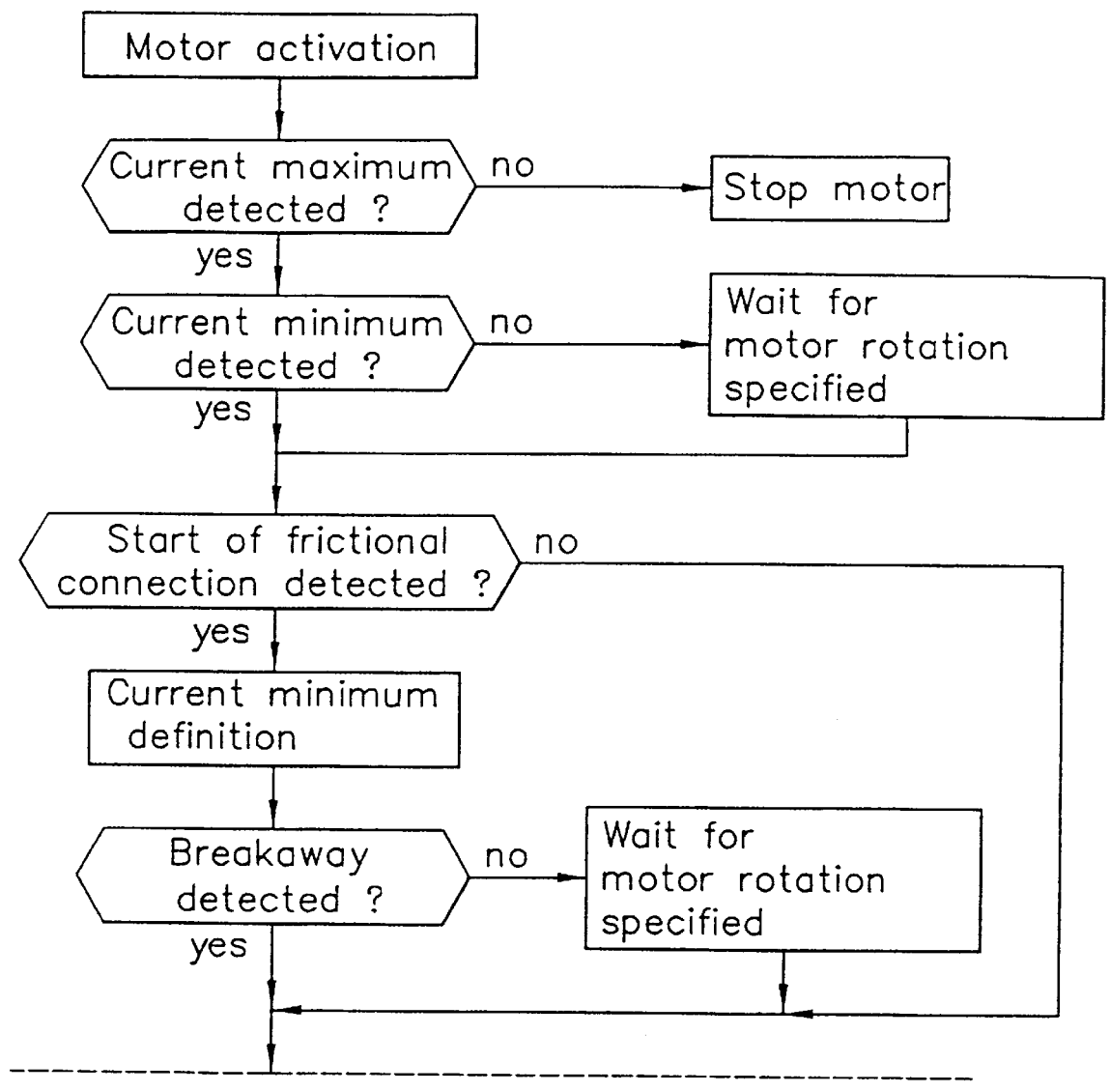
FIG. 2.2
FIG. 2.1

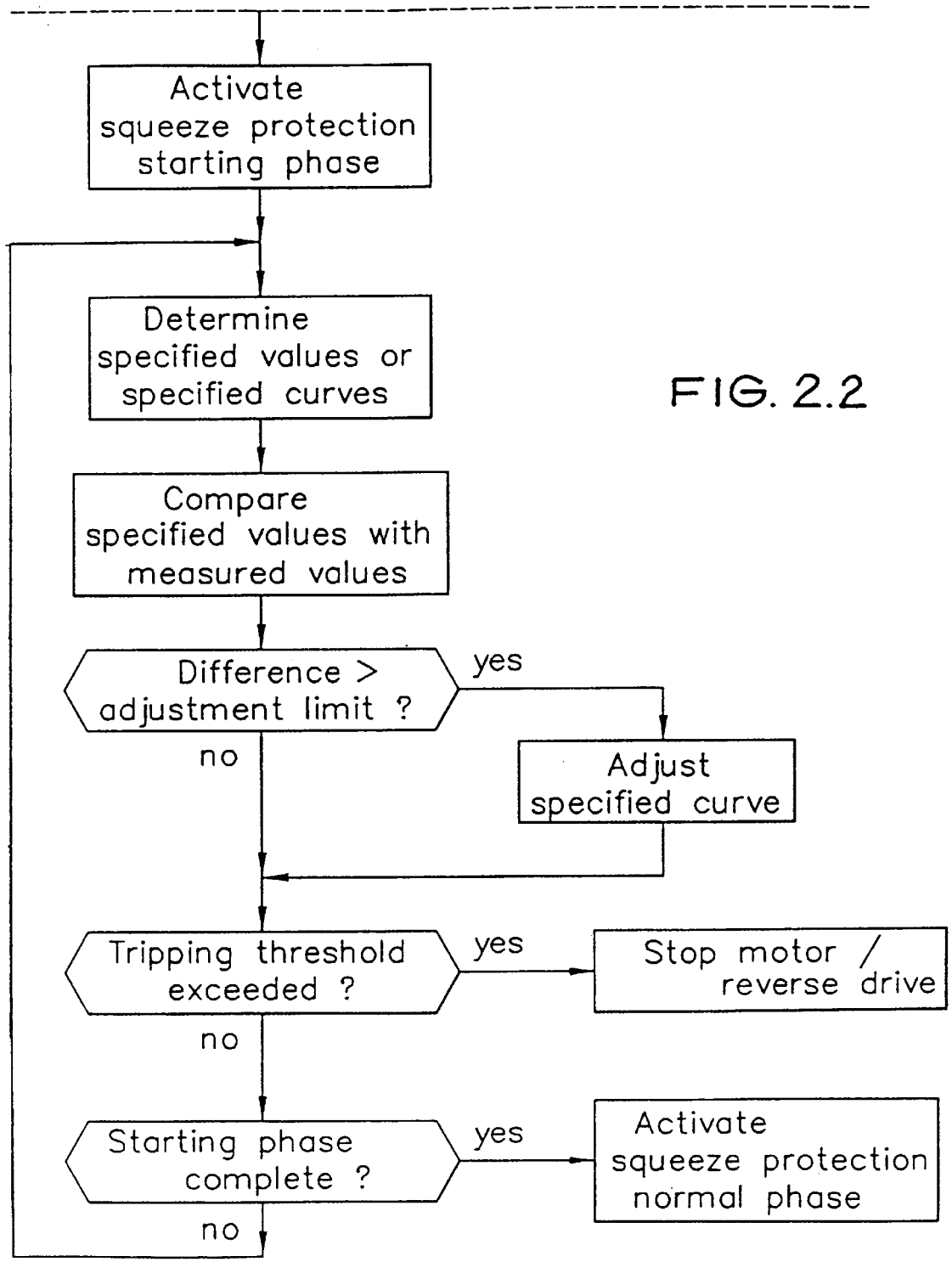
FIG. 2.2

PROCESS FOR CONTROLLING CLOSING MOVEMENT OF CLOSING MECHANISMS WITH IMMEDIATE SQUEEZE PROTECTION AFTER ACTIVATION OF A MECHANISM

BACKGROUND OF THE INVENTION

Closing mechanisms with parts moved by an electric motor are put to various uses—for example, in motor vehicles, for the electrical operation of side windows and sliding roofs. With control movements for these closing mechanisms and in particular with those closing movements which are automatic (i.e. when automatic functions are implemented), there is the risk that parts of the body or objects may get squeezed. Therefore, regulations prescribe that some of these closing mechanisms must be fitted with some kind of squeeze protection, although this should be a general provision for this type of closing mechanism for reasons of safety. To guarantee that squeeze protection will work, for example, the closing movement of the electromotive part can be monitored for any obstruction either by optical detection or by determination and evaluation (of the time history) of the squeezing force exerted when squeezing. Known sensors required for direct determination of the squeezing force make this an extremely expensive option (for example, force sensors or torque sensors). With know sensor, the squeezing force or its time history, is determined indirectly, by recording at least one performance characteristic of the motor typical for the load on the electric motor, to act as a measured variable (for example, in DE 30 34 118 C2, by recording the speed of the motor, or in DE 44 42 171 A1 by recording the current of the motor). The instantaneous measured value of the performance characteristic for the motor is evaluated by comparing it with a reference measurement or several reference measurements (i.e. the relative changes of the instantaneous measured variable are evaluated with regard to a past reference value of time or place for the same measured variable). Should a given limit be exceeded (tripping threshold), a squeezing incident will be assumed to have taken place, which will initiate a specific reaction from the closing mechanism (for example, the motor drive will go into reverse or the current to the motor will be switched off). However, it is a problem that there is often insufficient monitoring of the closing movement, and the associated lack of adequate squeeze protection, immediately after the closing movement has been activated (i.e. when the electric motor starts up). In this starting phase, there is no reference measurement and no suitable reference value available and thus, no squeeze protection. The closing movements which are a particular problem are those which immediately follow opening movements, as there is first an equalization of drive play ("compensation for play") in the closing mechanism (especially for the play in the motor/gearing). The result of this is that often, the distinction cannot be made between an increase in load which follows successful compensation for play (i.e. a build up of force after compensation for play, to overcome the static friction limit) and an actual squeezing incident.

One way to avoid this problem is to add a short opening movement before each closing movement (as described, for example in DE 35 14 223 C2 or DE 33 46 366 C2). This ensures firstly that the compensation for play and the subsequent increase in load (tensioning the mechanical arrangement of the closing mechanisms) is already completed once the electromotive part reaches its original position and that secondly, there is already a suitable reference value available for the evaluation. The disadvantage, however, is that the switching contact provided to activate the control movement (usually in the form of a relay) is put under load twice for each closing movement, which puts an increased strain on the switching contact, which is particularly undesirable in the car industry, on the grounds of the cost involved.

A further option is only to enable the automatic closing movement (automatic function) of the electromotive part, once a defined closing distance has been traveled. The disadvantage here, however, is that it is not possible to activate the automatic function immediately when the closing movement is activated, even if this is what is desired. This invention is based on the task to provide a process which can guarantee effective protection against squeezing, whatever the environmental conditions or operating conditions of the closing mechanism.

SUMMARY OF THE INVENTION

According to the invention, this task is solved by a process to for controlling the closing movement of closing mechanisms with at least one electromotive part wherein immediately after the start of a closing movement, the starting behavior of the closing mechanism in the starting phase of the electric motor is determined with regard to equalization of the drive play and the sluggishness of the closing mechanism with reference to measured values that are relevant to a closing distance of at least one motor performance characteristic and including the steps of activating squeeze protection in the starting phase when reaching an activation value relevant to the closing distance, specifying an additional response relevant to the closing distance of at least one motor performance characteristic until uniform motion of the electromotive part is achieved taking into consideration the measured values of at least one motor performance characteristic from previous and current closing movements and defining the tripping threshold of at least one motor performance characteristic relevant to the additional response relevant to the closing distance of the respective motor performance characteristic.

Advantageous further applications and developments result from the sub-claims. The inventive process described below makes it possible to detect squeezing incidents even in the starting phase of closing movements, by analyzing the starting behavior of the closing mechanism (i.e. from the first application of current to the electric motor to stationary operation of the electric motor in "normal phase"), with regard to compensation for play and sluggishness. This is particularly important for enabling a distinction to be made between the starting phase of a "normal" closing movement (without squeezing incidents) and a squeezing incident occurring during the starting phase, with often the same response from the motor performance characteristic used as a measured variable. This has the advantage that then, even if the automatic function takes effect immediately, a squeezing incident can be reliably detected in all phases of the closing movement, which means that the process provides effective protection against squeezing, thus guaranteeing a high level of safety.

The following successive procedural steps are provided to implement the process:

Determination of an activation value relevant to the closing distance (a value, which, if exceeded, will activate squeezing protection), in conjunction with at least one motor performance characteristic. This activation value defines the closing distance which must be traveled after the start of the closing movement, before squeeze protection should take effect. Either the closing distance traveled for the extreme value of a motor performance characteristic, or (if this extreme value of the motor performance characteristic cannot be significantly detected) the closing distance traveled for a predetermined maximum permissible number of motor revolutions, can be used for the activation value.

Characterization of the current closing movement with regard to any equalization of drive play (i.e. a distinction which establishes whether the starting phase of the current closing movement has occurred with or without compensation for play) and with regard to the (absolute) sluggishness of the closing movement or of the motor/gearing (taking into account the stiffness of the mechanical arrangement as a measure of its deformation), which has manifested itself during the torque of the electric motor and reflects the cumulative friction, by determining specified values for the motor performance characteristic(s) used as measured variable(s) for the current closing movement (measurement process). By specifying a starting value for the motor performance characteristic(s), the starting point for additional specified values of the current closing movement is established. By specifying a target value for the (predicted) final value for the specified values (the specified final value) and by specifying the functional response (relevant to the closing distance) of the motor performance characteristics, using a particular numeric function, the way in which this target value (specified final value) is to be achieved, is established. In particular, the local extreme value of a motor performance characteristic determined within a certain closing distance range (for example, the minimum of the motor current and/or the maximum of the motor speed), can be specified as the starting value, the final motor performance characteristic(s) value obtained in the previous closing movement can be specified as the specified final value and a squared dependency of the motor performance characteristic can be specified as the functional response, relevant to the closing distance.

Continual determination of the (current) measured values of the motor performance characteristic(s) and comparison with the respective specified values for motor performance characteristics relevant to the closing distance. Using this comparison of specified values relevant to the closing distance with the measured values of the respective motor performance characteristics or of the respective responses of the given motor performance characteristic (specified curve) with the response of the actually determined motor characteristic values (measuring curve) to produce a differential value. If an adjustment limit is exceeded, an adjustment is made to the specified values or to the specified curve and thus an adaptive adjustment of the specified values or of the specified curve to the measured values or the measuring curve. As a result, the specified curve will run without a squeezing incident at a defined distance, parallel to the measuring curve.

Continual production of a tripping threshold, based on the adaptively adjusted specified values of the motor performance characteristic(s) and on one constant offset value which reflects the tripping characteristic.

Evaluation of the current measured value of the motor performance characteristic(s) or of the response of the measuring curve(s) when making use of this tripping threshold. As the specified curve for a motor performance characteristic without a squeezing incident runs parallel to the measuring curve of this motor performance characteristic, at a defined distance, the tripping threshold is not obtained from a measured value of the motor performance characteristic of the current closing movement. However, if the current measured value of a motor performance characteristic exceeds the tripping threshold or the current measured values of a certain number of motor performance characteristics exceed each tripping threshold, a squeezing incident is assumed to have occurred, which initiates the intended reactions from the closing mechanisms (for example, the electric motor goes into reverse to start an opening movement).

Knowledge of the equalization of drive play (compensation for play) is taken into consideration when adapting the specified values of the motor performance characteristic/s, in particular for plausibility observations with regard to possible activation values relevant to the closing distance, or when evaluating the current measured values of the motor performance characteristic/s. Knowledge of the equalization of drive play (compensation for play) is obtained at least by evaluating the previous control movement (the last direction of movement) of the electromotive part. If the previous control movement was an opening movement, it will be assumed that compensation for play is taking place. Furthermore, a count value characterizing the current relative position of the electromotive part (for example, the counter reading of a counter which has been incremented or decremented to accord with the position of the electromotive part, generated using Hall sensors) can also be used and/or the signal response of at least one performance characteristic of the electric motor (for example the current and/or the speed of the motor), in particular by comparing the extreme value of the motor performance characteristic determined during the current closing movement (for example the minimum of the motor current and/or the maximum of the motor speed) with an extreme value determined from a great many closing movements (longterm filtering).

Furthermore, the tripping threshold can be varied, by taking disturbance variables into consideration (faults in the vehicle electrical system, mechanical vibrations of the closing arrangement).

BRIEF DESCRIPTION OF THE DRAWINGS

FIGS. 2a and b show a flowchart to clarify the process sequence;

DESCRIPTION OF A PREFERRED EMBODIMENT

In what follows, the process is described by means of an embodiment example, the electromotively operated window lift drive of a vehicle, using the current of the motor as the motor performance characteristic.

After specifying a close command for the windows of the vehicle (activating the closing movement), the window lift drive (the closing mechanism) is activated. In the starting phase of the window lift drive with compensation for play (FIG. 1a), there is first an equalization of drive play of the motor/gearing. The electric motor is already turning during this compensation for play, although the load affecting the electric motor is relatively slight. In the starting phase of the window lift drive without compensation for play (FIG. 1b), i.e. without equalization of the drive play of the motor/gearing (especially for starting without a change of direction), the mechanics of the vehicle doors are still pre-stressed from the previous raising of the window (the situation is one of frictional connection). After this more or less pronounced compensation for play, the load of the electromotive window lift drive (the closing mechanism) increases until it reaches the static friction limit, whereby the response of the increase in load is basically molded by the stiffness or elasticity of the gear mechanism and of the door panel of the vehicle doors. Once the static friction limit has been exceeded, the window will move and the electric motor will be loaded with the, by approximation, constant frictional force of the motor/gearing.

Figure 1A:
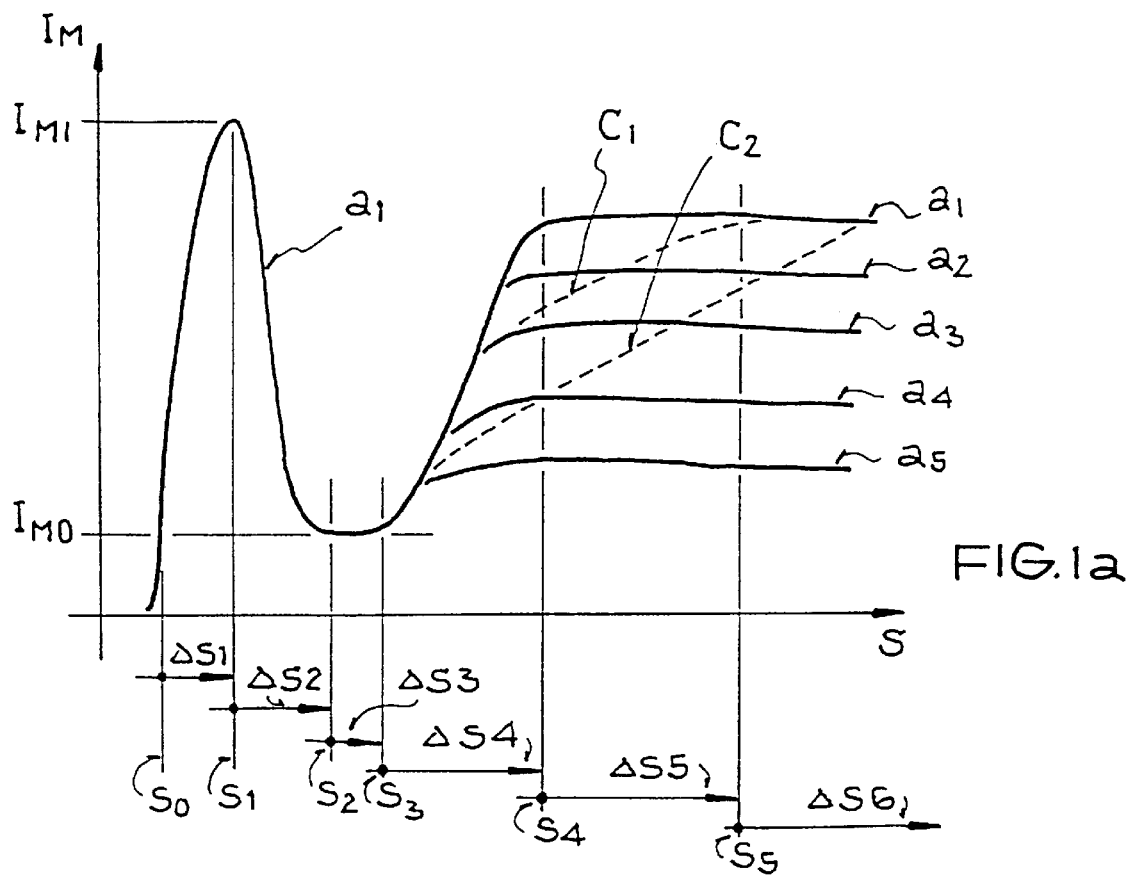
FIG. 1a is a graph illustrating the response of the motor performance characteristic relevant to the closing distance, with motor current $I_M$, on the ordinate and distances on the abscissa, when starting with compensation for play.
Figure 1B:
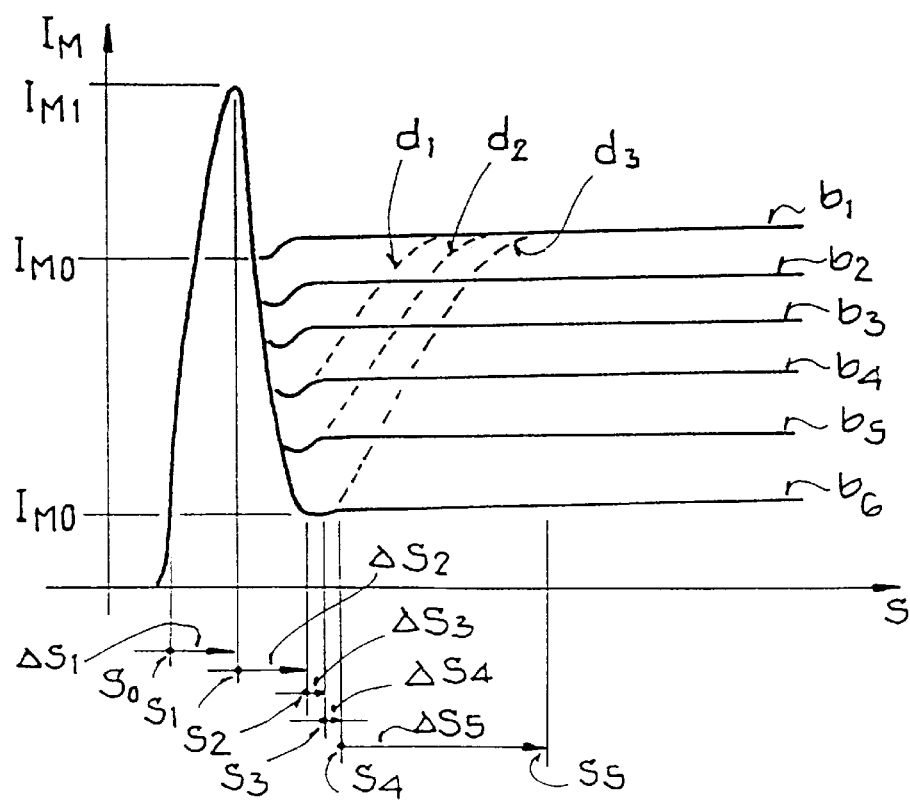
FIG 1b illustrates the response of the motor performace characteristic, similar to FIG. 1a for starting without compensation for play with varying sluggishness of the window lift drive.

Therefore, in accordance with FIGS. 1a and 1b, the response of the motor current $I_M$ in the starting phase of the window lift drive, i.e. after the activation of the window lift drive until the stationary condition of squeezing protection in "normal phase" (window travel approx. 2 cm), can be divided into four successive ranges, relevant to the closing distance:

- in the rise range (the starting current peak) in travel interval $\Delta s_1$ between closing distances $s_0$ and $s_1$. The current gradient in the rise range is basically determined by the inductance of the coil winding of the electric motor and the operating voltage of the window lift drive, the amplitude of the starting current peak (the maximum $I_{M1}$ of the motor current $I_M$) above and beyond this, by the internal static friction and the momentary armature position of the electric motor,
- in the free-running range in travel interval $\Delta s_2 + \Delta s_3$ between closing distances $s_1$ and $S_3$, in which the play of the window lift drive (rubber dampers of the gearing, lift mechanism) is equalized. The current gradient during current drop (the falling edge) is basically determined by the mass moment of inertia of the armature of the electric motor, the minimum $I_{M0}$ of the motor current $I_M$ for closing distance $s_2$ in the first approximation from the sliding friction of the motor/gearing. According to FIG. 1b, the free-running range (in particular, minimum $I_{M0}$ of motor current $I_M$) in the starting phase of the window lift drive without compensation for play, is only slightly pronounced,
- in the deformation range, in travel interval $\Delta s_4$ between closing distances $s_3$ and $S_4$, in which force builds up. In doing this, the vehicle doors (the door mechanism, in particular the door linkage and the door panel) are deformed with a certain deformation force, relevant to stiffness, so that the electric motor works, as it were, against a spring with a progressive spring constant,
- in the breakaway and motion range, in travel interval $\Delta s_5$ between closing distances $s_4$ and $s_5$; after reaching the initial breakaway torque, the window begins to move, which results in various curve responses, relevant to the sluggishness of the window lift drive (in particular, the effects of weathering and aging on the windows). See FIG. 1a for curves $a_1$, to $a_5$ and FIG. 1b for curves $b_1$, to $b_6$. The starting phase is concluded (closing distance $s_4$), if motor current $I_M$ is constant, i.e. if the window moves at a constant speed.

During the "normal phase" (i.e. the "normal" movement of the window) transient phenomena from the evaluation circuit provided for the evaluation of the response of motor current $I_M$, appear in travel interval $\Delta s_5$ between closing distances $s_4$ and $s_5$, so that squeezing protection in the normal phase is fully effective after closing distance $s_5$, i.e. in travel interval $\Delta s_6$.

FIG. 1a shows typical motor current courses ($a_1$–$a_5$) with full play compensation during the start-up overtime. Depending on the sluggishness of the window lift drive, a different course ($a_1$–$a_5$) is followed. For example course $a_1$, may illustrate how the window lift drive operates in low temperature, while course $a_5$ shows how the drive operates in high temperature. Courses $a_1$–$a_5$ (FIG. 1a) and $b_1$–$b_6$ (FIG. 1b) are limiting curves which, establish the possible region of operation, within which it is possible for a squeezing incident to be detected. Curves $c_1$, $c_2$ (FIG. 1a) and $d_1$, $d_2$, $d_3$ (FIG. 1b) describe the response relevant to the closing distance of motor current $I_M$, when a squeezing incident occurs in the starting phase of the window lift drive. Curves $c_1$ and $c_2$ show the change of a typical operating course as shown in $a_1$–$a_5$ to reflect the squeezing incident. Likewise, curves $d_1$–$d_3$ of FIG. 1b respectively show changes to the typical operating course of courses $b_4$–$b_6$.

As can be seen in FIGS. 1a and 1b (looking in particular at curve $a_3$ of FIG. 1a and curve $d_1$ of FIG. $1_b$), a closing movement of the window (raising the window) without compensation for play, for a squeezing incident (and here action must be taken straight away, for example reversing the drive of the electric motor) which takes place right at the start of the closing movement (in the starting phase) has the same response relevant to the closing movement of motor current $I_M$ as a sluggish window lift drive (or a sluggish window) with compensation for play but without a squeezing incident (there is no need to intervene here). This means that a very sluggish window or a sluggish window lift drive cannot be distinguished from a very tightly squeezed object, until the static friction has been overcome, with regard to motor current $I_M$.

As, in the string phase of the window lift drive, dynamic changes of load work at great amplitude and the evaluation circuit for determining the squeezing force is not yet operative (transient phenomena), to guarantee effective squeeze protection in the starting phase, the starting behavior of the window lift drive or the window, is analyzed, with regard to compensation for play and sluggishness, with reference to the response relevant to the closing distance of at least one motor performance characteristic, for example, that of motor current $I_M$.

Figure 3:
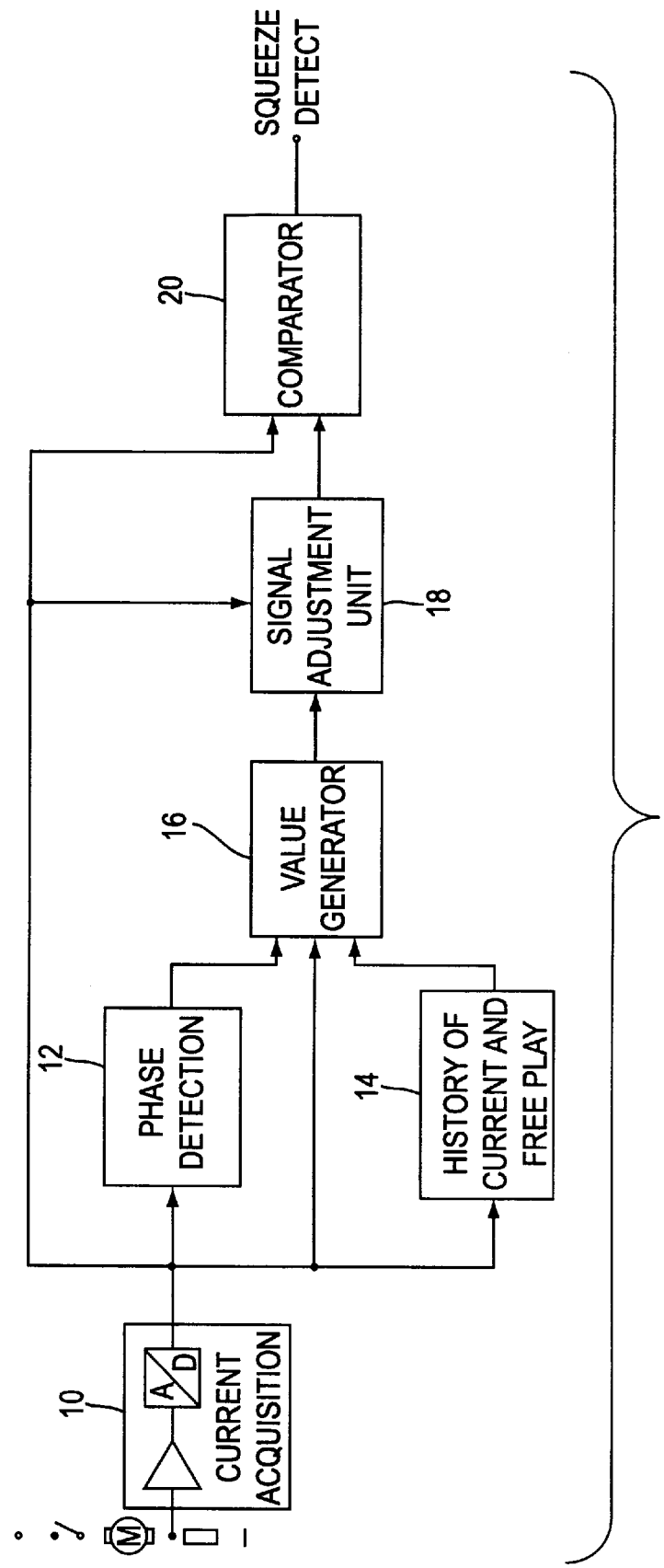
FIG. 3 is a block diagram of the squeeze protection system according to the invention.

FIG. 3 schematically illustrates the squeeze protection system according to the invention. Motor current is detected via current acquisition 10. The phase of the current is then examined via phase detection 12. The detected or measured current is additionally stored in history of current and free play 14. The final value of the motor current (stored in history 14), the measured current and the phase detected function are compared in a value generator 16 to produce a differential value. The differential value is forwarded to a signal adjustment unit 18 which determines if an adjustment limit has been exceeded and if adaptive adjustment of the differential value is needed. The tripping threshold is determined by the adaptive adjustment; and the detected or measured current is compared with the tripping threshold in comparator 20. If the measured motor current exceeds the tripping threshold, its assumed a squeezing incident has occurred and the appropriate response is generated (for example, reversing the drive or stopping the electric motor).

In accordance with the flowchart in FIG. 2a and b, by analogy to the subdivision relevant to the closing distance of the response of motor performance characteristic motor current $I_M$, after activating the electric motor, a number of procedural steps are provided relevant to the closing distance traveled:

Determining the starting current peak (of maximum $I_{M1}$ of motor current $I_M$):

The starting current peak (the maximum $I_{M1}$ of motor current $I_M$) characterizes the moment when the armature of the (direct current) electric motor breaks away. In the period from the initial application of current to the breakaway. the electric motor behaves like an RL element. It is therefore possible to derive from the rise behavior (the gradient of the rise) of motor current $I_M$ for smaller values of motor current $I_M$, a time limit by when the armature must have broken away, unless the drive is blocked. If no starting current peaks (no maximum $I_{M1}$ of motor current $I_M$) have been detected by this time limit, this means that the electric motor or the cabling of the electric motor is faulty, the drive and therefore the electric motor are stopped. If, on the other hand, a starting current peak has been detected (a maximum $I_{M1}$ of motor current $I_M$), move on to the next procedural step.

Determining the minimum $I_{M0}$ of motor current $I_M$:

The minimum $I_{M0}$ of motor current $I_M$ characterizes the moment at which the electric motor (as explained above) implements a more or less strongly pronounced equalization of drive play (a compensation for play). The minimum $I_{M0}$ of motor current $I_M$ occurs at the same time as the maximum of the motor speed. If a minimum $I_{M0}$ of motor current $I_M$ has been detected, move to the next procedural step. If, on the other hand, no significant minimum $I_{M0}$ of motor current $I_M$ has been detected (which can occur particularly in cases of closing movements without compensation for play), after a specified number of electric motor armature rotations (this number is specified using the maximum possible drive play), move on to the next procedural step.

Determining the start of frictional connection:

The start of frictional connection characterizes the moment when the frictional connection has been established between the electric motor (or its armature) and the window or the window lift drive, i.e. motor current $I_M$ climbs again once it has reached the minimum $I_{M0}$. If a minimum current rise has been detected (designated offset value on minimum $I_{M0}$), the value of the minimum $I_{M0}$ of motor current $I_M$ is defined (if applicable, this value replaces the minimum $I_{M0}$ defined earlier) and then go on to the next procedural step. If the minimum current rise has not been detected within a maximum number of armature rotations, move on to the next but one procedural step (activating the "normal" squeeze protection once the starting phase is complete).

Determining the breakaway (frictional connection phase):

The frictional connection phase between detecting the start of frictional connection and the breakaway of the window, characterizes the transition from static friction to sliding friction during the frictional connection between the electric motor (armature) and the window or the window lift drive, i.e. motor current $I_M$ shows a descending gradient. If the descending gradient of motor current $I_M$ has not been detected within a maximum number of armature rotations (this is specified using the maximum possible deformation travel in the frictional connection phase), move on to the next procedural step (activating the "normal" squeeze protection after completing the starting phase).

Activating squeeze protection starting phase:

In the frictional connection phase, squeeze protection is generated by comparing the measured motor current $I_M$ with a tripping threshold (determined using specified values from a specified curve for motor current $I_M$). In particular, squeeze protection is implemented in the frictional connection phase (starting phase) with reference to specified values $I_{MV}$ for motor current $I_M$, using the data of past control movements (raising the window, in particular the last raising). The specified values $I_{MV}$ are compared continuously with the current measured values $I_{MM}$ of motor current $I_M$ and if one of the fixed adjustment limits for the differential value between specified value $I_{MV}$ and current measured value $I_{MM}$ is exceeded, adapted in accordance with an adjustment to the specified curve. Based on these adapted specified values $I_{MV}$ of motor current $I_M$, a tripping threshold $I_{AS}$ is determined by adding an offset value $I_{OFF}$ and this tripping threshold $I_{AS}$ is compared with the measured values $I_{MM}$ of motor current $I_M$. If a measured value $I_{MM}$ of motor current $I_m$ exceeds the tripping threshold $I_{AS}$, it is assumed that a squeezing incident has occurred in the frictional connection phase (starting phase) and a response from the closing mechanisms relevant to this, is initiated (for example, reversing the drive and/or stopping the electric motor).

Activating "normal" squeeze protection in the normal phase after completing the starting phase:

Reaching closing distance $S_5$ characterizes the earliest possible moment for activating "normal" squeeze protection during "normal" (uniform) movement of the window.

The specified values $I_{MV}$ of motor current $I_M$ required for squeeze protection in the starting phase, are obtained by taking into consideration the final value of motor current $I_M$, determined during the previous raising of the window (during the previous closing movement), the extreme value (of minimum $I_{M0}$) of motor current $I_M$ in the free-running range as the starting value of the specified curve (this starting value basically already contains the friction components of the electric motor and the worm gearing) and the function response of the specified curve, determined using the buildup of force (characterized by the progressive spring rate of the gear mechanism).

The response relevant to the closing distance of the deformation force during force buildup after the start of frictional connection (i.e. in the deformation range and in the breakaway range/motion range), is imitated by a polynomial of the n-th order for motor performance characteristic motor current $I_M$, where, preferably in the same way as the relevance to travel of spring resistance, a polynomial of the second order is selected. The "spring rate" (the first derivation of spring resilience after travel, or in this case of motor current $I_M$ after closing distance s), corresponds to a straight line, the steepness (the second derivation of spring resilience after travel, or in this case of motor current $I_M$ after closing distance s) corresponds to a constant. The constant is determined in the first instance by the mechanical arrangement of the closing mechanisms and therefore changes only slightly for closing mechanisms of identical construction. The straight line or its ascending slope is determined in particular by the stiffness of the closing mechanism (of the window lift drive).

In this case, the specified values relevant to closing distances $I_{MV}(s)$ of motor current $I_M$ are obtained after detection (definition) of current minimum $I_{M0}$ and therefore by integration of the current gradient $m(s) \equiv dI_M/ds$:

$$I_{MV}(s) = I_{M0} + \int_0^s m(s)ds \quad (1)$$

To imitate the response of motor current $I_M$ relevant to the closing distance in accordance with FIG. 1a or 1b, the integration range is subdivided into two sections, relevant to closing distance s:

a) linear climbing current gradient m(s) in the range $0 \leq s \leq s_a$:

$$m(s \leq s_a) = m_o + K \int_0^{s_a} ds \qquad (2a)$$

K: door-specific parameter $m_0 \equiv dI_{M0}/ds$: current gradient (spring rate) for the determined current minimum $I_{M0}$ Therefore in this range, a parabolic response of motor current $I_M$ relevant to closing distance s is obtained, which reflects the progressive spring rate of the door mechanism.

b) Range $s_a < s < s_b$ (final value):

After a travel criterion (reversal point $s^a$) determined using the last raising of the window (last specified final value), the current gradient $m(s) = dI_M/ds$ is decremented to zero linearly up to closing distance $s_b$ (final value), in the same way as the transition of the window to a uniform motion. This travel criterion (reversal point $s_a$) is determined using the sluggishness of the doors determined during the previous closing movement (for example using a table function).

Therefore in the range $s_a < s \leq s_b$, this produces the following relation:

$$m(s_a < s \leq s_b) = m(s_a) - c \cdot K \int_{s_a}^{s_b} ds \qquad (2b)$$

c: door-specific parameter

The integration constant $I_{M0}$ in equation (1) corresponds to the measured current minimum, integration constant $m_0 \equiv dI_{M0}r/ds$ in equation (2a) is determined by a functional interrelationship, from current minimum $I_{M0}$. The two integration ranges and thus the two closing distances $s_a$ and $s_b$ are defined in such a way, for example, that the specified final value $I_{MV}$ ($s=s_b$) corresponds to about 1.5 times the final value actually achieved during the previous closing movement.

What is claimed is:

1. A process for controlling the closing movement of closing mechanisms with at least one electromotive part to guarantee squeeze protection including the steps of:

continuously recording and evaluating measured values of at least one motor performance characteristic which characterizes the load on the electric motor;

specifying a tripping threshold which defines a squeezing incident for each motor performance characteristic; and comparing the measured value of the respective motor performance characteristic with each tripping threshold and if the tripping threshold is exceeded by at least one measured value, a defined reaction is initiated from the closing mechanisms, wherein, immediately after starting a closing movement, the step of determining starting behavior of the closing mechanism in a starting phase of the electric motor begins, the starting behavior is determined with regard to equalization of drive play and sluggislness of the closing mechanism with reference to the measured values relevant to the closing distance of at least one motor performance characteristic and includes the following sub-steps:

activating squeeze protection in the starting phase to the response relevant to the closing distance of at least one motor performance characteristic when reaching an activation value relevant to the closing distance;

after activation of squeeze protection in the starting phase, specifying an additional response relevant to the closing distance of at least one motor performance characteristic until uniform motion of the electromotive part is achieved, taking into consideration the measured values of at least one motor performance characteristic from previous and current closing movements; and defining the tripping threshold of at least one motor performance characteristic relevant to the additional response.

2. A process according to claim 1, wherein, once the activation value relevant to the closing distance has been reached, the additional response relevant to the closing distance for each motor performance characteristic is defined by specified values of the motor performance characteristic relevant to the closing distance, and further comprising the additional steps of:

continuously evaluating the specified values relevant to the closing distance for each motor performance characteristic by generating a differential value with respect to time between the specified value relevant to the closing distance and the current measured value, and comparing the differential value with an adjustment limit in such a way that, if the adjustment limit is exceeded, the additional response relevant to the closing distance for each motor performance characteristic, is adapted to the actual response of the motor performance characteristic;

defining the tripping threshold of each motor performance characteristic using the adapted specified values of the motor performance characteristic obtained by adapting the additional response of the motor performance characteristic relevant to the closing distance and an offset value which determines the tripping characteristic; and when the tripping threshold is exceeded by the measured value of a given number of motor performance characteristics, initiating an opening movement of the closing mechanism.

3. A process according to claim 2, wherein the specified values of each motor performance characteristic relevant to the closing distance are determined using the activation value relevant to the closing distance, a specified final value and a given functional response of the motor performance characteristic relevant to the closing distance.

4. A process according to claim 3, wherein the specified final value is determined using the final value of each motor performance characteristic of the previous closing movement and the given functional response of motor performance characteristics relevant to the closing distance, using a numeric function and at least one motor performance characteristic starting value.

5. A process according to claim 4, wherein a parabola of the second order is given as the numeric function.

6. A process according to claim 4, wherein the activation value relevant to the closing distance, for activating squeeze protection in the starting phase, is used as the starting value for each motor performance characteristic.

7. A process according to claim 1, wherein one of the extreme value of a motor performance characteristic and the measured value of a motor performance characteristic corresponding to the closing distance traveled after a certain number of motor rotations is used as the activation value relevant to the closing distance, for activating squeeze protection in the starting phase.

8. A process according to claim 1, wherein, if equalization of the drive play is determined, the specified value of each motor performance characteristic relevant to the closing distance is adapted.

9. A process according to claim 8, wherein the existence of equalization of drive play is defined using determination of the direction of movement of the previous control movement of the closing mechanism.

10. A process according to claim 9, wherein the existence of equalization of drive play is further defined by determining the current position of the electromotive part and/or the response relevant to the closing distance of at least one motor performance characteristic.

11. A process according to claim 10, wherein the determination of the current position of the electromotive part makes use of a counter value and the determination of the response of the at least one motor performance characteristic relevant to the closing distance uses the motor performance characteristic extreme value.

12. A process according to claim 1, wherein the tripping threshold is adjusted, taking into consideration disturbance variables, especially faults in the vehicle electrical system or mechanical vibrations of the closing mechanism.

13. A process according to claim 4, wherein at least the motor current is used as the motor performance characteristic and the minimum motor current is used as the starting value for the given functional response of the motor performance characteristic.

* * * * *